Aug. 4, 1964 J. MULLER 3,143,137
QUICK-ACTING BIASED VALVED COUPLING FOR FLUID PIPE
Filed May 16, 1961 4 Sheets-Sheet 1

Inventor
JACQUES MULLER
By *Imirie & Smiley*
Attorneys

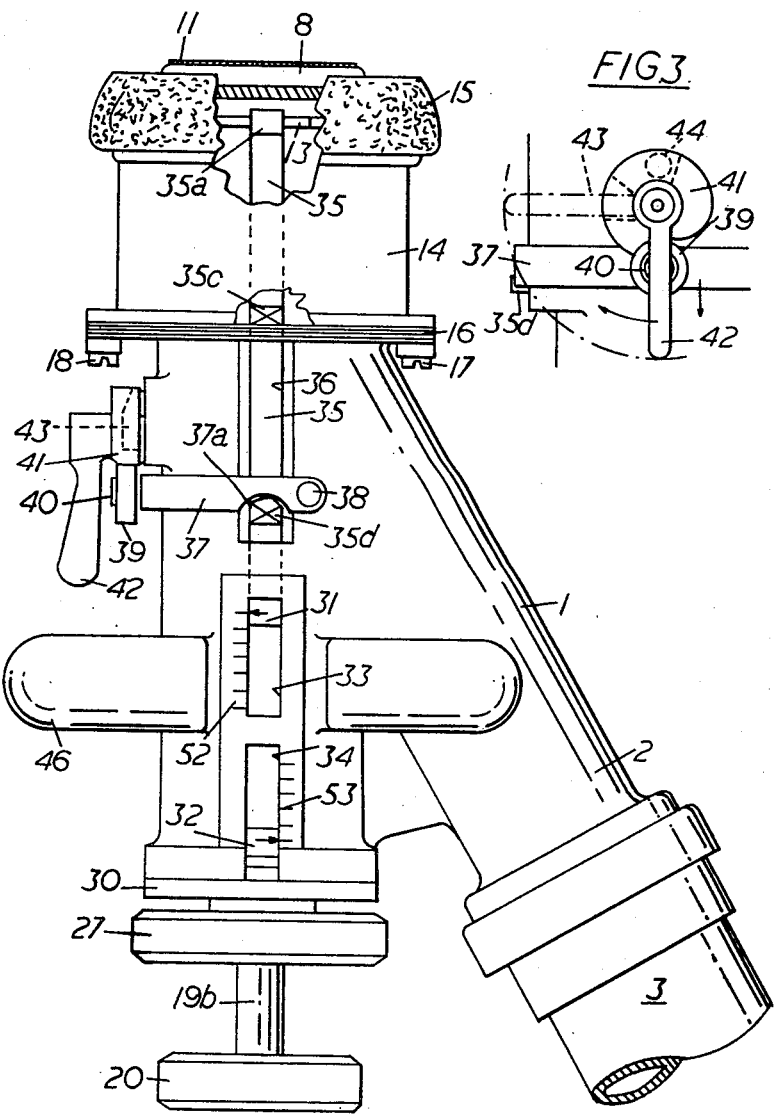
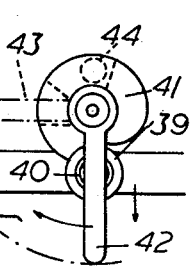

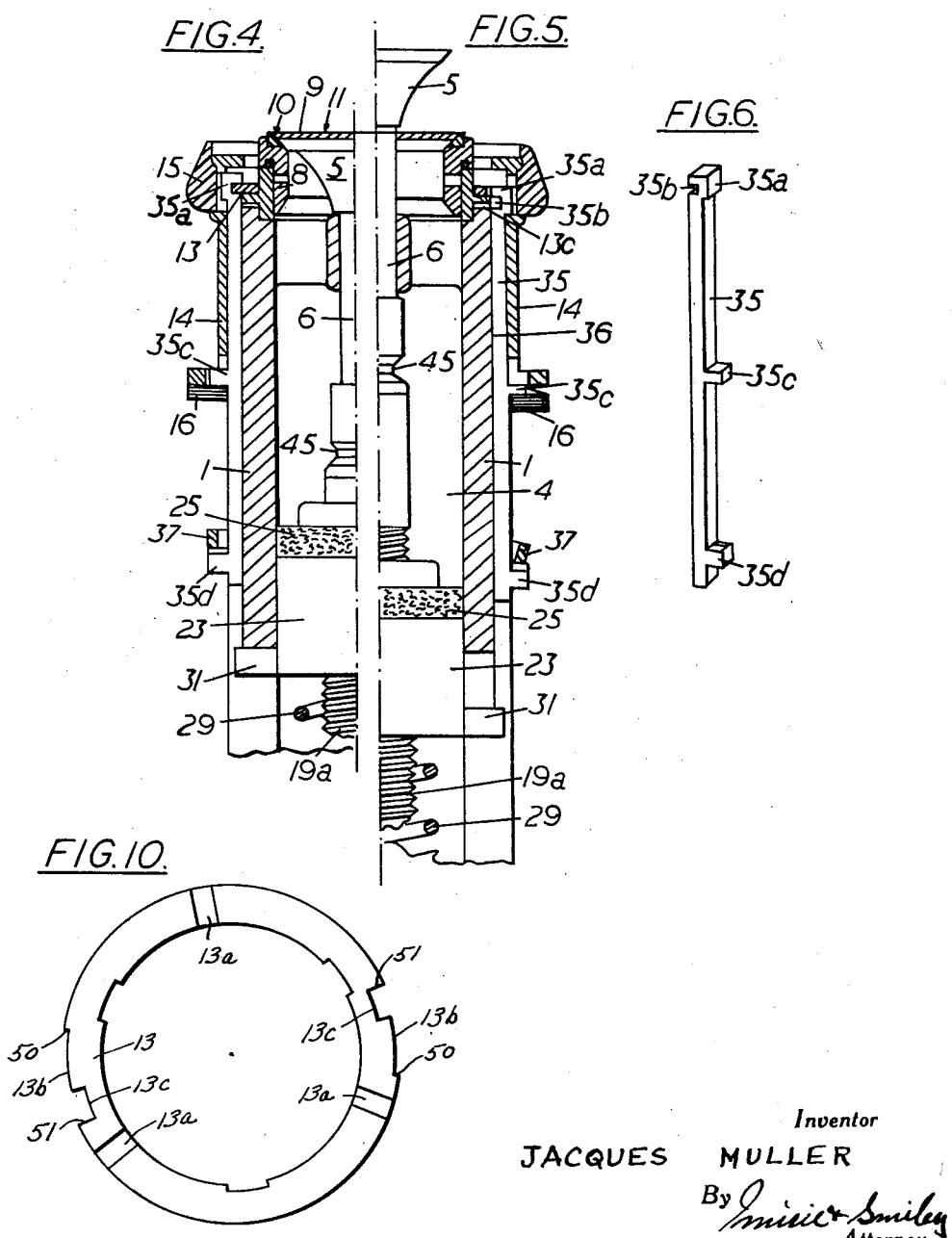

Aug. 4, 1964 J. MULLER 3,143,137
QUICK-ACTING BIASED VALVED COUPLING FOR FLUID PIPE
Filed May 16, 1961 4 Sheets-Sheet 4
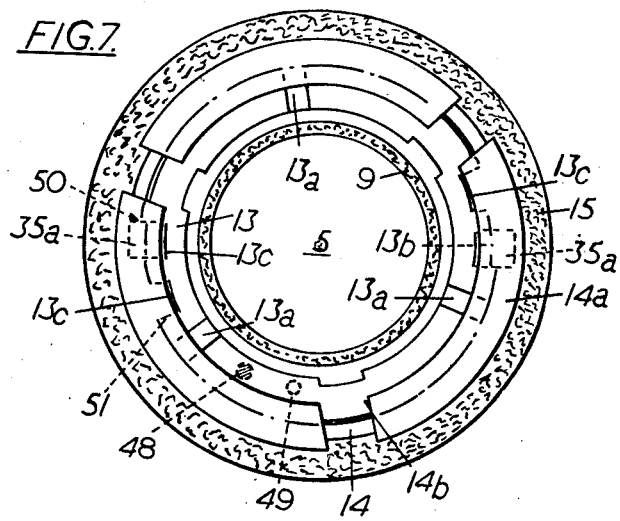
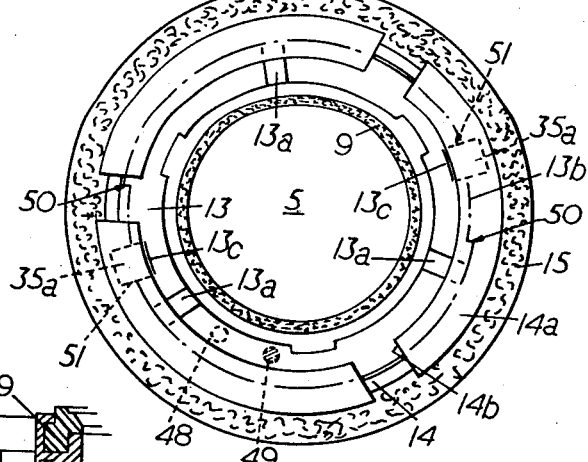
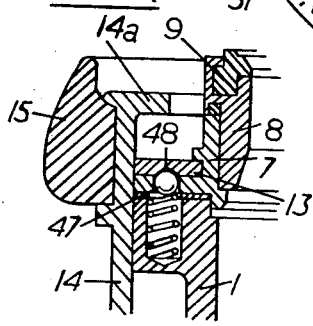
Inventor
JACQUES MULLER
By
Attorneys

United States Patent Office 3,143,137
Patented Aug. 4, 1964

3,143,137
QUICK-ACTING BIASED VALVED COUPLING FOR FLUID PIPE
Jacques Muller, 123 Avenue du General de Gaulle, La Garenne-Colombes, France
Filed May 16, 1961, Ser. No. 110,557
Claims priority, application France May 24, 1960
4 Claims. (Cl. 137—552)

This invention relates to valve structures, and more particularly to a valve structure for incorporation in a coupling adapted for rapidly connecting a flexible pipe to the connector of a tank, reservoir or conduit for the purpose of transferring fluids, especially liquids which are inflammable or dangerous to handle, at controlled pressure and rate of flow, the pressure and rate of flow being variable if desired.

One object of the invention is to provide a valve structure for incorporation in a quick-acting pipe coupling by which the flow of fluid through the coupling may be controlled.

A further object is to provide a valve structure containing a manually operated valve which may be locked in the closed position.

Another object is to provide a valve structure containing a valve which is interlocked with the coupling mechanism of a quick acting pipe coupling so that the valve cannot be opened unless the coupling has been attached to an appropriate connector, and which cannot be detached unless the valve has first been closed.

The invention consists of a pipe coupling comprising a hollow body having means at one end for rapidly coupling said body to a connector on a tank or conduit or the like, a branch on said body to which another pipe may be connected, a valve in said body co-operating with a seating adjacent said one end thereof to control the flow of fluid between said one end of said body and said branch, and manually operated means for controlling the position of said valve.

There may be a manually operated lock to lock said valve in its closed position and means interconnecting said lock with said rapid coupling means at said one end of said body, so arranged that said valve cannot be manually unlocked and opened until said coupling has been coupled to said connector and said coupling cannot be uncoupled from said connector until said valve has been locked in said closed position.

Further objects and advantages of the invention will become apparent from a study of the following description of one embodiment of the invention, having reference to the accompanying drawings in which—

FIGURE 2 is an external view corresponding to FIGURE 1;

FIGURE 3 is a detailed view of a locking cam;

FIGURES 4 and 5 show locking bars in the locked and unlocked positions respectively;

FIGURE 6 is a perspective view of a locking bar;

FIGURES 7 and 8 show in plan view the arrangement of the coupling parts in the locked and unlocked positions;

FIGURE 9 is a detail showing a ball detent for limiting the relative angular movement of locking members in the coupling; and FIGURE 10 shows a locking ring for engaging a connector with the coupling.

Figure 1:
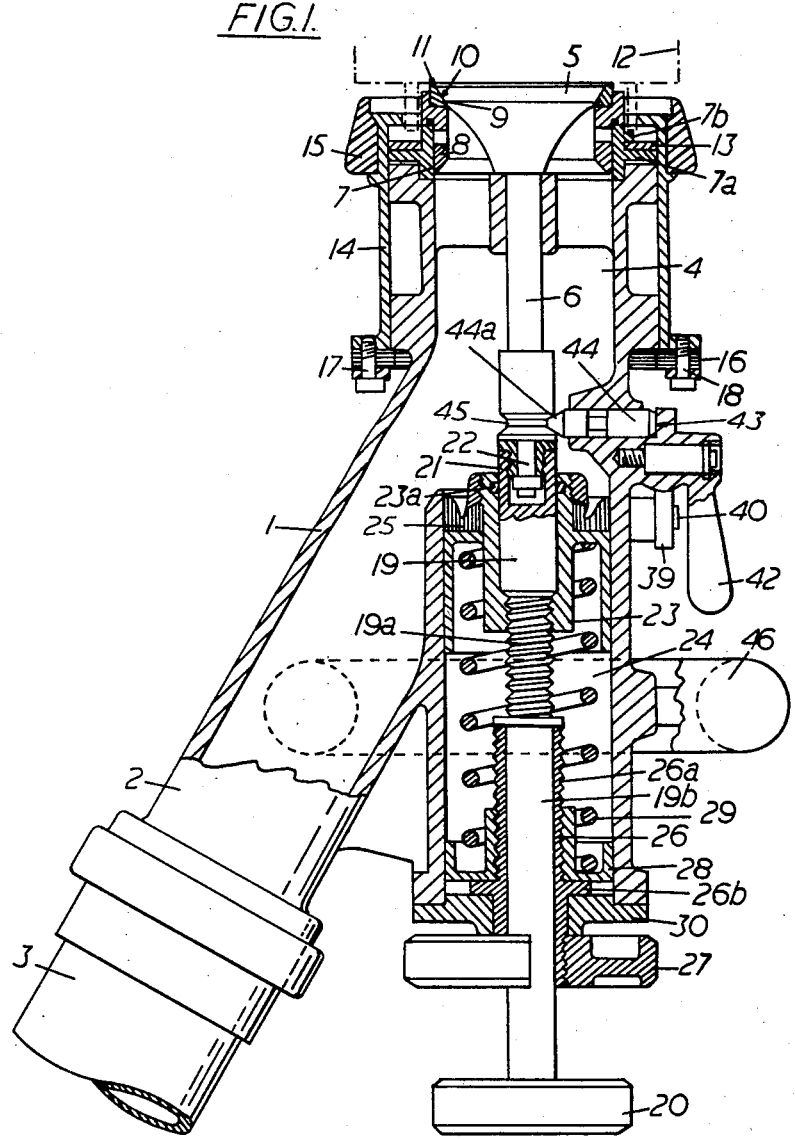
FIGURE 1 is a sectional elevation of the valve structure according to the invention incorporated in a quick acting pipe coupling.

Referring initially to FIGURES 1 and 2 a quick-acting coupling according to the invention comprises a hollow body 1 consisting of a straight section adapted at one end to couple to the connector of a tank, conduit or the like, having hand wheels for control at the other end, and a branch 2 set at an angle provided with appropriate means by which it is connected to a fluid intake pipe 3. The branch 2 is directed towards the portion 4 of the body, which contains a poppet type valve 5 centered and guided in the body by its stem 6. At the upper end of the portion 4 of the body is a tubular member 7, to which is attached a sleeve 8 containing, at its upper end, an annular joint 9 embedded in its end, the projecting part of the annular joint 9 being shaped to form a seat 10 for the valve 5 and also having an upper face 11 which provides a fluid seal in the connector of the tank, conduit or the like, the connector being indicated by chain-dotted lines. The joint 9 is made of resilient material.

The member 7 is provided with a flange 7a on which a locking ring 13 is retained by teeth 7b on the member 7.

The locking ring 13 (shown in FIGURES 1–5 and 7–10) is provided with projections 13a, shown in FIGURES 7 and 8, as well as stepped recesses cut to depths 13b and 13c respectively, situated at diametrically opposite points on the periphery of the ring. The width and positions of the projections 13a, as well as their thickness, is chosen to suit members (not shown) in the connector which, when the coupling is coupled to the connector, engage the projections on the ring.

The part 4 of the body is surrounded by a tubular member 14, shown in FIGURES 1, 2, 7 and 8, having at its upper end an internally flanged portion 14a provided with slots 14b which are also arranged and shaped to suit interengaging parts (not shown) of the connector. The part 14 is provided at its upper end with a protective ring 15 of rubber or equivalent substance and at its lower end with a stack 16 of deformed washers constituting a spring, the washers being fixed to the member 14 only at two diametrically opposite points 17 and 18. The washers are adapted to be deformed under pressure to reduce the height of the stack by one half.

The stem 6 of the valve 5 is connected to a control spindle 19 which terminates in a hand wheel 20. The spindle 19 is connected to the valve stem by a running joint 21 which forms a rigid coupling in the axial direction but permits relative rotation between the spindle 19 and the valve stem 6, so that the valve cannot be forced to rotate against the seat 10 by turning the hand wheel 20. This saves unnecessary wear of the valve seat.

The spindle 19 comprises a screw threaded portion 19a which engages an internal screw thread in a hollow piston-like member 23 adapted to move axially within a cylindrical bore 24 formed in the body 1. At its upper end the member 23 is provided with an annular sliding fluid-tight joint 25 which prevents leakage of fluid into the bore 24 while an internal gland 23a prevents leakage along the spindle 19. Below the screw-threaded portion 19a the spindle 19 comprises a smooth cylindrical portion 19b which passes through a sleeve 26 rotatably mounted in an end cap 30 attached to the body 1. A hand wheel 27 is attached to the outer end of the sleeve.

The sleeve 26 has an externally screw-threaded portion 26a which engages an internal screw thread in a second hollow piston-like member 28 arranged in the opposite manner to the member 23 within the bore 24. By rotating the spindle 19, by means of the hand wheel 20, the member 23 may be moved upwardly or downwardly to the extent allowed by the length of the screw thread 19a and by rotating the sleeve 26, by means of the hand wheel 27 the member 28 may be moved upwardly or downwardly within the bore 24. The sleeve 26 is provided with a shoulder 26b which forms an end location for the sleeve 26 in the cap 30 and also forms a stop to limit the downward movement of the piston 28. The members 23 and 28 form abutments for a calibrated compression spring 29 disposed therebetween.

At the upper end of the cylindrical portion 19b of the spindle 19 is a shoulder which bears upon the inner end of the sleeve 26 to provide end location.

To prevent rotation of the members 23 and 28 during their axial displacement both are provided with lugs, respectively 31 and 32, at diametrically opposite points (FIGURES 2, 4 and 5) which are guided in slots 33 and 34 formed in the body 1. These slots pass right through the wall of the body so that the ends of the lugs 31 and 32 are visible from the outside of the valve.

From the description so far given it will be evident that the valve 5 may be moved axially into and out of engagement with the seat 10 by operation of the hand wheels 20 and 27 through the medium of the spring 29. Opening the valve by moving the valve 5 out of engagement with the seat 10 allows fluid to flow from the tank, conduit or the like past the valve and into the branch pipe 3. The structure is intended for operation in situations in which the flow is in this direction. According to a feature of the invention a safety device is incorporated which prevents the valve from being opened unless the coupling has been coupled on to the connector and which prevents uncoupling unless the valve has been closed. The locking device comprises two sliding locking bars 35, shown in FIGURES 2, 4, 5 and 6, which are positioned on either side of the body 1 in grooves 36. Each of the locking bars is provided with a head 35a (FIGURE 6) provided with a recess 35b, and lugs 35c and 35d. The lugs 35c project through the body to engage the stack of washers 16 at points intermediate the fixings of the stacks at 17 and 18 and the lugs 35d, the upper faces of which are cut away at angles, and are located in slots 36 (FIGURE 2), also passing through the body. The lugs 35d engage a stirrup 37 mounted on pivots 38 at opposite sides of the body and a roller 39 is mounted on a spindle 40 projecting from the centre of the stirrup. The roller 39 is in contact with a snail cam 41 (FIGURE 3) which, by rotation by means of a handle 42, causes downward movement of the stirrup, carrying with it the bars 35 by means of their lugs 35d, when these bars are enabled to move.

The rear face of the snail cam 41 is provided with an inclined surface 43 which bears on the outer end of a locking pin 44 (FIGURE 1) having a conical inner end 44a adapted to engage a V groove 45 in the valve stem.

FIGURES 4 and 7 show that when the valve is in the locked position (i.e. with the locking pin 44 engaging the valve stem) the ring 13 is engaged in the slots 35b of the locking bars 35, which are shown shaded in FIGURE 7 to facilitate identification. To free the locking bars 35, the heads 35a of these bars must be opposite the recesses 13c of the ring 13, as shown in FIGURE 8. The ring 13 can only be moved round to this position with respect to the body of the coupling by engaging the end with the connector on the tank, conduit or the like, so that the mating parts of the two units inter-engage, and then turning the coupling by means of a hand wheel 46 formed on the body 1. This attaches the coupling to the connector, as in well-known types of rapid-acting coupling, and since the ring 13 is engaged by an appropriate part on the connector it is held against rotation while the body of the coupling is being rotated to make the connection. In consequence the ring 13 is placed in such a rotational position with respect to body 1 as to place the heads 35a of the locking bars 35 within the slots 13c. A ball detent 47, engaging recesses 48 and 49 (FIGURES 7 and 8), and end stops 50 and 51 in the recesses 13b and 13c, ensure that the coupling is rotated through the appropriate angle to place the ring 13 in the unlocked position. Disengagement of the locking bars 35 enables the stirrup 37 to be lowered by rotation of the snail cam 41, which frees the locking pin 44, so that the valve stem is released. The valve can then be opened to any desired degree according to the rate of flow and the pressure desired in effecting the transfer of the fluid through the coupling. It should be noted that the locking pin 44 is automatically disengaged when the valve moves into the open position due to the lower inclined edge of the V groove pressing against the conical end 44a of the locking pin.

The coupling can only be uncoupled from the connector if the valve is in its closed position because rotation of the ring 13 in relation to the body of the coupling is only possible if the locking bars 35 have been returned to their upper position so that the ring 13 is in alignment with the grooves 35b. The locking bars can only return to their upper position under the influence of the stack 16 of spring washers if the stirrup 37 has been allowed to rise by turning the cam 41 to the "valve locked" position by means of the operating handle 42, thus forcing the locking pin 44 into the V groove 45.

Any desired pressure and/or rate of flow are obtained by displacement of the pistons 23 and 28 with respect to the screw threads 19a and 26a, by operating the hand wheels 20 and 27. The displacement of the individual pistons not only causes the valve to open to any desired extent (when it is not locked in the closed position) but also to vary the compression of the calibrated spring with the object of maintaining a given aperture and to allow the aperture to vary automatically if the pressure or the rate of flow tends to vary. By operation of the hand wheel 20, which acts on the piston 23, the valve may be moved until the pressure of the fluid and that of the spring are balanced.

Graduations 52 and 53 (FIGURE 2) at the sides of the window slots 33 and 34, in co-operation with suitable markings on the ends of the lugs 31 and 32 of the pistons 23 and 28, permit regulation of the rate of flow and pressure precisely to predetermined levels.

I claim:

1. In a pipe coupling comprising a hollow body having means at one end adapted for rapidly coupling said body to a connector on a tank or conduit or the like, and a branch on said body to which another pipe may be connected, an improved valve structure comprising a poppet type valve having a stem guided in said body co-operating with a seating adjacent said one end thereof to control the flow of fluid between said one end of said body and said branch, a control spindle co-axial with said valve stem connected thereto by a running joint, said control spindle having a screw thread along a part of its length, a member forming a spring abutment mounted for axial movement but held against rotation engaged by said screw thread, a hand wheel attached to said control spindle, whereby rotation of said control spindle causes axial displacement of said abutment with respect to said valve stem, a rotatable sleeve mounted in the other end of said body co-axial with said control spindle, an external screw thread on the portion of said sleeve inside said body, a second hand wheel attached to the portion of said sleeve outside said body, an internally threaded member engaged by said screw thread on said sleeve constituting a second spring abutment, and a compression spring located between said two abutments, whereby rotation of said hand wheels varies the pressure exerted by said spring on said valve and the position of said valve for a given spring pressure.

2. In a pipe coupling the improved valve structure as claimed in claim 1 further comprising an axially movable locking pin having its axis at right angles to the axis of said valve stem, said locking pin having a conical end, a circumferential V groove in said valve stem adapted to be engaged by said conical end of said locking pin, a snail cam rotatable on an axis parallel to the locking pin axis, an inclined surface on one face of said snail cam engaging the other end of said locking pin, whereby rotation of said snail cam causes said locking pin to move into and out of locking engagement with said valve stem, a handle to rotate said snail cam, a stirrup pivoted at its ends on opposite sides of said body carrying a roller at its centre which is engaged by said snail cam, two locking bars slidable in grooves on opposite sides of said body in directions parallel to said valve stem axis, projections on said locking bars engaging the two sides of said stirrup, a ring supported in said one end of said body having two slots through which said locking bars pass, heads on said locking bars having slots which are engaged by said ring upon rotation from the position in which said locking bar heads lie within said slots, projections on said ring adapted to be engaged by said connector, whereby when said coupling is engaged with said connector and rotated through a prescribed angle to fix said coupling in position said ring is held against rotation by said connector and said ring is brought to a rotational position with respect to said body in which said locking bars may pass through said slots and said snail cam may be rotated to move said stirrup and draw said locking bars away from said one end of said body, thereby allowing said locking pin to be withdrawn from engagement with said valve stem.

3. In a pipe coupling the improved valve structure as claimed in claim 2 further comprising lugs on said locking bars and spring means which are deflected when said locking bars are moved away from said one end of said body by operation of said snail cam and which return said locking bars to their locking position when said snail cam is rotated to lock said valve stem.

4. In a pipe coupling the improved valve structure as claimed in claim 2 in which said two spring abutments comprise piston-like members axially movable in a bore of said body, and projections on said piston-like members passing through slots in said body, said projections preventing rotation of said piston-like members and having indicating marks formed on their outer surfaces, said slots forming windows and having graduation marks at their sides co-operating with said indicating marks whereby the positions of said spring abutments with respect to said body is visible.

References Cited in the file of this patent
UNITED STATES PATENTS

| | | |
|---|---|---|
| 547,506 | Sleigh et al. | Oct. 8, 1895 |
| 2,679,407 | Badger | May 25, 1954 |
| 2,680,030 | Hoelzer | June 1, 1954 |
| 2,686,529 | Lanninger | Aug. 17, 1954 |
| 2,777,716 | Gray | Jan. 15, 1957 |
| 2,997,052 | Mangini | Aug. 22, 1961 |